United States Patent
Akay et al.

(10) Patent No.: US 10,968,887 B2
(45) Date of Patent: Apr. 6, 2021

(54) TRAILING EDGE ASSEMBLY

(71) Applicant: Siemens Gamesa Renewable Energy A/S, Brande (DK)

(72) Inventors: Busra Akay, Herning (DK); Peder Bay Enevoldsen, Vejle (DK); Alejandro Gomez Gonzalez, Aarhus (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 144 days.

(21) Appl. No.: 16/259,008

(22) Filed: Jan. 28, 2019

(65) Prior Publication Data

US 2019/0234376 A1  Aug. 1, 2019

(30) Foreign Application Priority Data

Jan. 29, 2018 (EP) ..................................... 18153823

(51) Int. Cl.
*F03D 7/02* (2006.01)
*F03D 1/06* (2006.01)

(52) U.S. Cl.
CPC .......... *F03D 7/0232* (2013.01); *F03D 1/0641* (2013.01); *F03D 1/0675* (2013.01);
(Continued)

(58) Field of Classification Search
CPC .... F03D 7/0232; F03D 1/0675; F03D 1/0641; F03D 1/0683; F03D 80/00;
(Continued)

(56) References Cited

U.S. PATENT DOCUMENTS 2,011,902 A * 8/1935 Leigh ........................ B64C 9/32
244/215
2,278,304 A * 3/1942 Conrad .................. F01D 25/243
415/215.1
(Continued)

FOREIGN PATENT DOCUMENTS

CA          2811574 A1 * 10/2013 ........... F03D 7/0204
CN        101338727 A     1/2009
(Continued)

OTHER PUBLICATIONS

Wolff, T; et al.; "Aerodynamic behavior of an airfoil with morphing trailing edge for wind turbine applications"; The Science of Making Torque from Wind 2014, Journal of Physics: Conference Series 524.
(Continued)

*Primary Examiner* — J. Todd Newton
(74) *Attorney, Agent, or Firm* — Schmeiser, Olsen & Watts LLP (57) ABSTRACT

Provided is a trailing edge assembly of a wind turbine rotor blade, which includes a mounting portion; a flap portion flexibly connected to the mounting portion so that a flap angle subtended between the mounting portion and the flap portion can be altered; a volume adjustable chamber arranged between the mounting portion and the flap portion and realised to alter its volume between a minimum volume associated with a minimum flap angle and a maximum volume associated with a maximum flap angle; and at least one tube to face into an airflow passing over the airfoil region of the rotor blade, and an inner orifice arranged to face into the interior of the volume adjustable chamber such that an airflow between the outer orifice and the inner orifice alters the volume of the volume adjustable chamber. Embodiments of the invention further describe a wind turbine rotor blade.

14 Claims, 5 Drawing Sheets

(52) U.S. Cl.
CPC .... *F03D 1/0683* (2013.01); *F05B 2240/2211* (2013.01); *F05B 2240/301* (2013.01); *F05B 2240/311* (2013.01); *F05B 2250/14* (2013.01); *F05B 2250/183* (2013.01); *F05B 2270/402* (2013.01)

(58) Field of Classification Search
CPC .......... F05B 2250/183; F05B 2270/402; F05B 2240/2211; F05B 2240/301; F05B 2250/14; F05B 2240/311; F05B 2260/96; Y02E 10/72
USPC ...................................................... 416/223 R
See application file for complete search history.

(56) References Cited

U.S. PATENT DOCUMENTS

| | | | | |
|---|---|---|---|---|
| 2,616,509 | A * | 11/1952 | Thomas | B64C 3/30 416/84 |
| 3,047,257 | A * | 7/1962 | Chester | F15B 15/10 244/226 |
| 3,614,260 | A * | 10/1971 | Ellinger | F01D 5/148 416/23 |
| 3,987,984 | A * | 10/1976 | Fischer | B64C 3/46 244/219 |
| 6,015,115 | A * | 1/2000 | Dorsett | B64C 3/46 244/123.11 |
| 7,293,959 | B2 * | 11/2007 | Pedersen | F03D 7/024 416/23 |
| 7,922,450 | B2 | 4/2011 | Narasimalu | |
| 8,251,656 | B2 * | 8/2012 | Stiesdal | F03D 7/0232 416/23 |
| 8,517,682 | B2 * | 8/2013 | Hancock | F03D 7/0232 416/23 |
| 8,851,840 | B2 * | 10/2014 | Hancock | F03D 1/0675 416/23 |
| 8,899,923 | B2 * | 12/2014 | Hancock | F03D 1/0641 416/23 |
| 9,039,372 | B2 * | 5/2015 | Hancock | F03D 7/0232 416/146 R |
| 10,507,909 | B2 | 12/2019 | Cave et al. | |
| 2006/0145483 | A1 * | 7/2006 | Larsen | F03D 7/0224 290/44 |
| 2008/0292461 | A1 * | 11/2008 | Stiesdal | F03D 7/0232 416/147 |
| 2009/0028704 | A1 * | 1/2009 | Rebsdorf | F03D 7/0232 416/23 |
| 2009/0028705 | A1 * | 1/2009 | Meldgaard | F03D 7/0252 416/23 |
| 2012/0169060 | A1 | 7/2012 | Loh et al. | |
| 2018/0010579 | A1 | 1/2018 | Akay et al. | |
| 2018/0171975 | A1 * | 6/2018 | Rohm | F03D 1/0675 |

FOREIGN PATENT DOCUMENTS

| | | | |
|---|---|---|---|
| CN | 106794898 A | 5/2017 | |
| DE | 102015113404 A1 | 2/2017 | |
| EP | 2475874 B1 | 8/2016 | |
| EP | 3128169 A1 | 2/2017 | |
| WO | WO-2009025548 A1 * | 2/2009 | ............ F03D 7/022 |
| WO | 2010023278 A2 | 3/2010 | |
| WO | WO-2010124914 A2 * | 11/2010 | .......... F03D 1/0641 |
| WO | 2011064214 A2 | 6/2011 | |
| WO | WO-2011147422 A2 * | 12/2011 | .......... F03D 1/0675 |
| WO | WO-2016116102 A1 * | 7/2016 | .......... F03D 1/0675 |

OTHER PUBLICATIONS

Andersen, P.B.; et al.; "Integrating Deformable Trailing Edge Geometry in Modem Mega-Watt Wind Turbine Controllers"; Proceedings of the European Wind Energy Conference; Brussels 2008.

Peter Bjorn Andersen; et al.; "A Dynamic Stall Model for Airfoils with Deformable Trailing Edges"; Wind Energy; 2009 vol. 12; pp. 735-751.

Buhl, T.; et al.; "Potential Load Reduction Using Airfoils with Variable Trailing Edge Geometry"; Journal of Solar Energy Engineering, vol. 127, pp. 503-516; Nov. 2005.

European Search Report corresponding to EP Application No. 18153823.2, dated Aug. 6, 2018.

* cited by examiner

TRAILING EDGE ASSEMBLY

CROSS-REFERENCE TO RELATED APPLICATIONS

This application claims priority to EP Application No. 18153823.2, having a filing date of Jan. 29, 2018, the entire contents of which are hereby incorporated by reference.

FIELD OF TECHNOLOGY

The following relates to a trailing edge assembly of a wind turbine rotor blade; and a wind turbine rotor blade comprising at least one such trailing edge assembly.

BACKGROUND

During operation of a wind turbine, its rotor blades are subject to aerodynamic loads. It is usual to adjust the angle of attack and/or the rotational velocity of the rotor blades in order to keep the blade loading at an acceptable level while aiming to keep the wind turbine power output at the desired level. This is done by adjusting the rotor blade pitch angle by means of a pitch drive at the interface between rotor blade and hub. The angle of attack and/or rotational velocity may be reduced as needed, for example by adjusting the rotor blade pitch angle by a suitable amount or by adjusting the torque of the generator of the wind turbine. The rotor blade loading is kept to an acceptable level in order to avoid structural damage, for example fatigue of the structural components and materials, with the aim of avoiding failure during the planned lifetime of the rotor blade.

The corrective measures described above—e.g. adjusting the pitch angle and/or adjusting rotational velocity of the rotor blades—work well in steady wind conditions. However, atmospheric wind is rarely steady over long intervals, and is more usually irregular with gusts and turbulence leading to fluctuations in loading. A typical turbulent wind field contains regions with higher wind speeds and regions with lower wind speeds. During a wind gust or a high turbulence event, the peak speed can be significantly higher than the mean wind speed. The changes in loading as the rotor blades pass through these regions result in fatigue loads on the rotor blades and the wind turbine supporting structure. Large variations in the wind field can be seen by the aerodynamic rotor of a wind turbine that stands in the wake of an upstream turbine. A problem with the corrective measures described above—i.e. corrective measures limited to adjusting the blade pitch angle—is that they are not quick enough to prevent excessive loading by gusts, turbulent wind fields or wakes. Therefore, even though pitch control is effective in maintaining rotor speed and turbine power, the ability to counteract rapid load variations is limited.

An alternative approach is to alter the shape of the airfoil to reduce loading on the blade. This can be done using any one of various kinds of actively controlled adjustable trailing edge flaps. By implementing adjustable flaps in the trailing edge of a blade (generally in an outboard region of the rotor blade) it is possible to modify the distribution of loads along the rotor blade.

Most adjustable or adaptive trailing edge flap arrangements known from the known art are actively controlled, i.e. these systems require some kind of actuator (mechanical, electrical, hydraulic, etc.), a controller to determine the amount of actuation required, and feedback sensors. Additional effort and cost is associated with the need for a dedicated flap control system in addition to the pitch control system. While these systems allow precise adjustment of the trailing edge geometry in response to fluctuating aerodynamic loads, they suffer from a number of disadvantages. For example, any components must be installed within the blade so as not to affect the airflow over the blade, but it is difficult and expensive to install and service complex actuator systems inside wind turbine rotor blades. Furthermore, any moving parts are prone to failure. These actuator systems must be serviced, but their location in an outboard region of the blade interior makes such maintenance procedures difficult and costly. Joints, hinges or connectors at the outside of an adaptive flap system may be damaged by ice build-up in cold conditions. Also, the metal parts and/or electrical components in the rotor blade interior must be electrically isolated from any lightning conductors to ensure that the lightning protection system is not compromised, and to avoid damage to the adaptive trailing edge flap arrangements from flash-over during a lightning strike. Furthermore, active components usually require the use of feedback sensors, which are also subject to the drawbacks mentioned above.

SUMMARY

An aspect relates to provide a more economical and straightforward way of adjusting the flap angle of a wind turbine rotor blade.

According to embodiments of the invention, the trailing edge assembly of a wind turbine rotor blade comprises a mounting portion shaped for mounting to an airfoil region of the rotor blade and a flap portion flexibly connected to the mounting portion so that a flap angle subtended between the mounting portion and the flap portion can be altered, and a volume adjustable chamber connected to the flap portion and realised to alter its volume between a minimum volume associated with a minimum flap angle and a maximum volume associated with a maximum flap angle. The inventive trailing edge assembly further comprises at least one tube extending at least through the mounting portion and comprising an outer orifice arranged to face into an airflow passing over the airfoil region of the rotor blade, and an inner orifice arranged to face into the interior of the volume adjustable chamber such that an airflow between the outer orifice and the inner orifice alters the volume of air of the volume adjustable chamber.

An advantage of the inventive trailing edge assembly is that it allows an entirely passive adjustment of the flap angle in response to flow conditions over the blade surface. The flap angle adjustment is made without any mechanical or electrical actuators or controllers. Instead, the principle of embodiments of the invention is to use the airflow over the blade to "inflate" or "deflate" the volume adjustable chamber, which in turn results in a flap angle change. The change in flap angle occurs essentially immediately in response to air entering or leaving the volume adjustable chamber.

Airflow over a wind turbine rotor blade, particularly airflow over a rotor blade airfoil, has been the subject of intense study over the last decades. It is known that the stagnation pressure in the boundary layer airflow over the rotor blade airfoil is related to various parameters such as the angle of attack and the relative velocity of the airfoil, which in turn is a function of the rotational velocity of the rotor blade and the incoming wind speed, amongst other factors.

The underlying idea of embodiments of the invention is to allow stagnation pressure in the boundary layer over an airfoil to determine the volume of the volume adjustable chamber, and therefore also the flap angle. The tube is open to the airflow over the blade, so that—if the air pressure is sufficiently large—the volume of the chamber will increase. If the air pressure drops again, the volume of the chamber will decrease. The flap angle therefore adjusts very quickly in response to any alteration in stagnation pressure in the boundary layer. Each of the two orifices or open ends of a tube is therefore an inlet or an outlet, depending on the stagnation pressure. Even though air also exits the chamber through this tube, for the sake of simplicity the tube is referred to as an "air intake tube" in the following.

Since the stagnation pressure is a function of parameters mentioned above, the behaviour of the flap—i.e. when and by how much it moves—will therefore also be determined by those parameters. For example, the behaviour of the flap will depend on the rotational velocity of the rotor blade and also on the angle of attack in that section of the rotor blade. Since the tangential velocity at a point along a rotor blade depends both on the rotational velocity of the rotor and on the distance of that point from the hub, the behaviour of the flap will also depend on its position along the blade.

The entirely passive functionality of the inventive trailing edge assembly allows significant savings in cost and effort compared with the known art active flap systems.

According to embodiments of the invention, the wind turbine rotor blade comprises at least one such trailing edge assembly mounted in the airfoil region of the rotor blade, in the outboard region of the rotor blade. The inventive rotor blade can react to changes in angle of attack without the need for any signal feedback, actuators, motors etc. Instead, response to an alteration in angle of attack is entirely passive. During operation at a given rotational speed, the lift coefficient of the airfoil section is directly related to the angle of attack. If the angle of attack increases—for example because of natural variations in the wind, or because of operating conditions of the wind turbine—the velocity of the airflow in the boundary layer over the airfoil will decrease, and the thickness of the boundary layer will increase (within the linear region of the airfoil's lift curve i.e. the graph of lift coefficient against angle of attack), and the stagnation pressure in the boundary layer at a given height above the surface will decrease. The drop in stagnation pressure allows the chamber to deflate accordingly. As the volume of the chamber decreases, the flap angle will decrease, thereby reducing the lift and also reducing the load on the rotor blade.

Similarly, if the angle of attack decreases—for example because of natural variations in the wind, or because of operating conditions of the wind turbine—the thickness of the boundary layer over the airfoil will decrease, the velocity of the airflow in the boundary layer at a given height above the surface will increase, resulting in an increase in stagnation pressure in the volume adjustable chamber, and this will inflate accordingly. The resulting increase in flap angle leads to a corresponding increase in lift, so that the wind turbine can extract more energy from the wind.

These two effects combined mean that for fluctuation in angle of attack, the variations in lift are lower than compared to an airfoil that does not have any flap adjustment means. In particular, the slope of the lift curve is effectively reduced for increasing angles of attack.

Compared to a rotor blade without any flap angle adjustment means, the inventive rotor blade can better withstand the loading arising from unintended variations in angle of attack.

Compared to a rotor blade with an active flap angle adjustment means, the inventive rotor blade achieves the same result but with significantly lower manufacturing and maintenance costs.

In the following, it may be assumed that a rotor blade has an essentially circular root end that transitions smoothly to an airfoil portion, and that the airfoil portion continues to the outermost tip of the blade. The airfoil portion will gradually change from a relatively thick airfoil shape with a long chord (close to the root or transition region) to a thinner airfoil shape with a short chord (close to the tip of the blade. The term "outboard region" is often used to refer approximately to the outer third of the blade. At least one embodiment of the inventive trailing edge assembly is arranged in the rotor blade outboard region. One or more embodiments of the inventive trailing edge assembly may also be arranged further inboard.

The inventive trailing edge assembly extends outward from the rotor blade body so that the chord of the airfoil shape is effectively extended. The dimensions of the inventive trailing edge assembly are such that the flap portion extends outward from the rotor blade airfoil by at least 2% of the chord length of the airfoil portion, and may extend outward by up to 20% of the chord length of the airfoil portion. In an outboard portion of the blade, i.e. along the outermost third of the rotor blade, the flap portion of the trailing edge assembly extends outward from the rotor blade airfoil by at least 4%-8% of the local chord length. The total chord length may be understood as the chord length of the airfoil shape given by the rotor blade airfoil and the non-moving part of the trailing edge assembly.

The inventive trailing edge assembly allows the flap angle to be adjusted in an entirely passive manner. Therefore, the terms "trailing edge assembly" and "passive flap system" are used interchangeably in the following.

It has been observed that an adjustment in flap angle of 2° to 3° has a similar load reduction effect as a 1° change in rotor blade pitch angle. Therefore, in a particularly exemplary embodiment of the invention, the passive flap system is realised to change the flap angle by up to 5°, by up to 10°, and by up to 15°. An entirely passive flap angle increase of 9° can for example have the same beneficial effects as an increase in pitch angle of 3°. A wind turbine without any means of adjusting the flap angle of its rotor blades must decrease the rotor blade pitch angles in order to avoid excessive blade loading. Embodiments of the invention allow the blade loading to be reduced in an entirely passive manner, i.e. without any need for motors, actuators and the like, and without having to make a trade-off between power output and blade loading.

In an exemplary embodiment of the invention, the tube is realised so that its first orifice or air intake opening is arranged within the boundary layer. The first orifice of the air intake opening has an elliptical cross section, whereby the short axis of the ellipse is oriented perpendicularly to the rotor blade so that the elliptical opening is favourably positioned within the boundary layer. The cross sectional area of the air intake opening is at least 30 mm$^2$. The first orifice is arranged to face into the airflow at a level close to the upper edge of the boundary layer for normal operating wind speeds and angles of attack. Any tube of the inventive trailing edge assembly is dimensioned so that its first orifice ("air intake orifice") is arranged at a height of at least 5 mm above a surface of the rotor blade, and may be arranged at a height of 10 mm or even 30 mm above the surface of the rotor blade. The height of the first orifice may be chosen according to the boundary layer thickness at that point along the rotor blade length. The boundary layer thickness will be governed largely by the airfoil shape at that point along the rotor blade. For example, the first orifice of a tube positioned at the beginning of the outboard portion may be higher than the first orifice of a tube positioned closer to the tip.

In an exemplary embodiment of the invention, each rotor blade is equipped with several embodiments of the inventive trailing edge assembly, with different air intake opening heights. The trailing edge assemblies are distributed along the rotor blade trailing edge so that the air intake openings decrease in height with increasing distance from the root end of the blade. The air intake opening of the outermost trailing edge assembly will have the shortest height, while the air intake opening of the innermost trailing edge assembly will have the greatest height. While a minimum air intake opening height for an "outboard" trailing edge assembly may be at about 5 mm, the air intake opening height of a trailing edge assembly closer to the root end may be 10 mm or more, maybe even up to 30 mm.

The mounting portion is shaped for mounting to the pressure side of the rotor blade airfoil region. For example, the mounting portion can comprise an essentially smooth band or strip that can be glued or otherwise fastened to a matching smooth band or strip on the pressure side of the rotor blade airfoil.

The inventive trailing edge assembly can be realised so that part of the mounting portion extends outward from the airfoil, so that a tube extends through the mounting portion into the volume adjustable chamber. This realisation allows an existing blade to be retro-fitted with an embodiment of the inventive passive flap system.

Alternatively, the inventive trailing edge assembly can be realised so that the mounting portion does not extend beyond the airfoil. In this embodiment, a tube extends through the airfoil and also through the mounting portion into the volume adjustable chamber. This realisation may be exemplary when a rotor blade is designed to include an embodiment of the inventive passive flap system.

There are various ways of realising the volume adjustable chamber. In an exemplary embodiment of the invention, the volume adjustable chamber is realised as an inflatable body such as a hose or balloon. Such an inflatable body may be made of a suitable elastic material that can expand when inflated, for example rubber, latex, synthetic rubber, etc. In such an embodiment, the flap portion is realised to enclose the volume adjustable body.

Alternatively, the inflatable body is not made of a material than stretches, but instead comprises a corrugated or ribbed portion extending along a "seam" between a long edge of the mounting portion and a long edge of the flap portion. When air fills the inflatable body, the ribbed portion acts like a bellows to allow the inflatable body to increase in volume.

In an alternative realisation, the volume adjustable chamber is defined by surfaces of the mounting portion and flap portion. Such an embodiment of the inventive trailing edge assembly comprises a labyrinth interface between the mounting portion and the flap portion. For example, a relatively wide band along the edge of the flap portion may extend into two complementary bands along the edge of the mounting portion, moving freely outwards as air fills the chamber through the air intake tube and moving back inwards again as air leaves the chamber through the air intake tube.

The inventive passive flap system is constructed so that the stagnation pressure can "inflate" the chamber to its maximum volume. In other words, the stagnation pressure will overcome the inherent stiffness or resilience of the passive flap system in order to achieve the desired flap angle increase. To this end, the materials used to construct the passive flap system are selected on the basis of properties such as resilience, stiffness, elasticity, mass, etc. The inventive trailing edge assembly is realised to achieve maximum "inflation" or maximum volume increase at a low angle of attack of at most 4°-6°. Similarly, the inventive trailing edge assembly is realised to achieve maximum "deflation" (minimum volume), i.e. to revert to its default state at a relatively large angle of attack of 11°-12°. By suitable choice of material and by suitably dimensioning the parts of the passive flap system, it is possible to arrive at a volume adjustable chamber that will increase in volume when the angle of attack of the airfoil is small (with a correspondingly thin boundary layer over the airfoil and a relatively high stagnation pressure, making the chamber inflate to result in a downward deflection of the flap) and which will return to its default or non-inflated state when the angle of attack of the airfoil is large (with a correspondingly thick boundary layer over the airfoil and a relatively low stagnation pressure, making the chamber deflate, causing the flap to move back). The elements of the trailing edge assembly are realised to assume an initial state (chamber is deflated; volume is minimum) for an angle of attack of at least 11°-12°.

Serrations along the trailing edges of wind turbine rotor blades have been used to improve the blade performance and to decrease aerodynamic noise. In an exemplary embodiment of the invention, therefore, the trailing edge assembly comprises a plurality of serrations arranged to extend outward from the flap portion.

The first orifice of any tube of the inventive passive flap system is shaped to discourage water from entering. However, it may not be possible to completely prevent water from entering the tube and the volume adjustable chamber. Therefore, to avoid damage from water freezing inside the volume adjustable chamber, the inventive trailing edge assembly comprises a number of drainage openings to allow water to exit the chamber.

A rotor blade "sweeps" a circular area with each complete revolution. This rotor swept area of a wind turbine is determined by the length of its rotor blades. As mentioned above, the behaviour of the inventive passive flap system is related to the relative velocity of the airfoil. However, there may be differences in this relative velocity over the rotor swept area, caused for example by differences in relative wind speed arising from yaw error, wind shear, etc. To counteract excessive flap movements that would result from such differences within the rotor swept area, the trailing edge assembly may comprise tubes arranged on both the pressure and suction side.

Other objects and features of embodiments of the present invention will become apparent from the following detailed descriptions considered in conjunction with the accompanying drawings. It is to be understood, however, that the drawings are designed solely for the purposes of illustration and not as a definition of the limits of embodiments of the invention.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
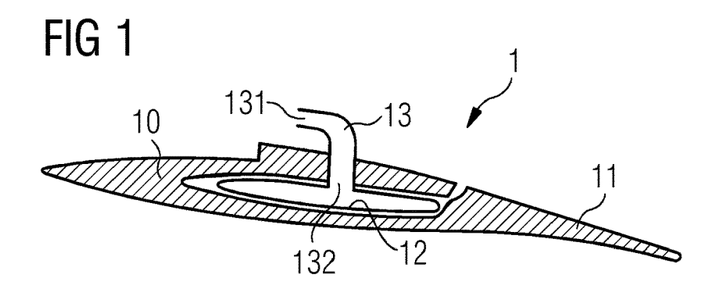
FIG. 1 shows a cross-section through an embodiment of the inventive trailing edge assembly.

FIG. 1 shows a cross-section through an embodiment of the inventive trailing edge assembly 1 or passive flap system 1. The passive flap system 1 has a mounting portion 10 shaped for mounting to an airfoil region of a rotor blade, and a flap portion 11 that is flexibly connected to the mounting portion 10. In all the embodiments described herein, the flexible connection is achieved by using a suitably elastic material. The material "hinge" allows a flap angle subtended between the mounting portion 10 and the flap portion 11 (indicated in FIG. 5 and FIG. 8) to be altered smoothly. In this embodiment of the inventive passive flap system, an inflatable hose 12 or balloon-like body 12 is arranged between the mounting portion 10 and the flap portion 11. A tube 13 extends through the mounting portion 10 and opens into the inflatable hose 12. The tube has an outer orifice 131 arranged to face into an airflow, and an inner orifice 132 arranged to face into the interior of the inflatable hose 12 such that an airflow between the outer orifice 131 and the inner orifice 132 alters the volume of the inflatable hose 12.

Figure 2:
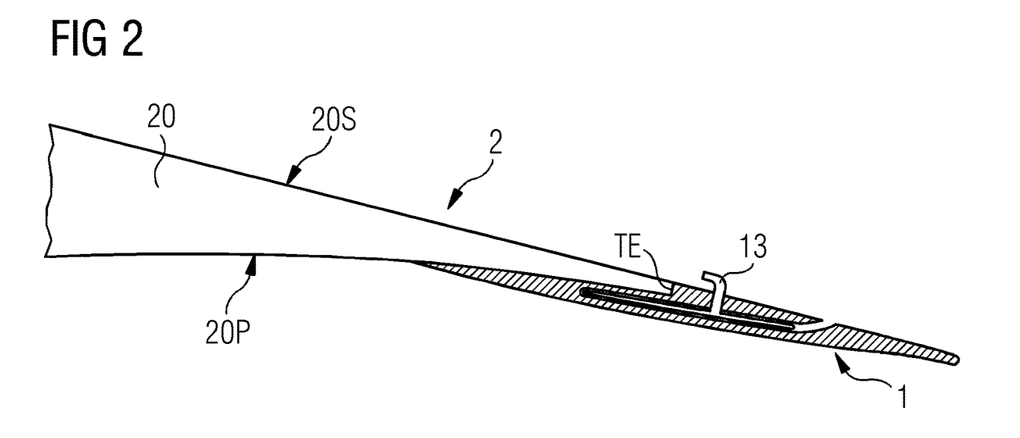
FIG. 2 shows the trailing edge assembly of FIG. 1 in place on a wind turbine rotor blade.

FIG. 2 shows the trailing edge assembly 1 of FIG. 1 in place on an airfoil portion 20 of a wind turbine rotor blade 2. The diagram shows that the mounting portion 10 is attached to a surface of the pressure side 20P of the airfoil 20, for example by an adhesive. The diagram indicates that a chamfered shape of the mounting portion 10 matches the thickness of the trailing edge of the airfoil 20, so that a smooth transition is achieved between the suction side 20S of the airfoil 20 and the trailing edge assembly 1. In the state shown here, the flap portion 11 effectively acts as an extension of the trailing edge TE of the airfoil 20.

Figure 3:
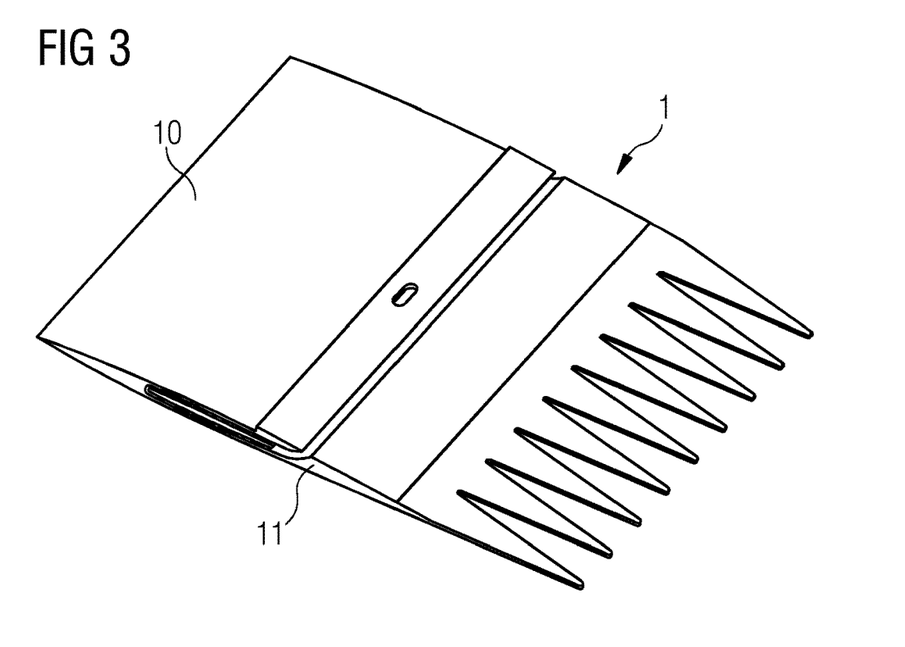
FIG. 3 shows a perspective view of an embodiment of the inventive trailing edge assembly.

FIG. 3 shows a perspective view of an embodiment of the inventive trailing edge assembly 1. This embodiment is essentially the same as that shown in FIGS. 1 and 2 above, and shows an opening in the mounting portion 10 to receive the tube 13 later on. This diagram also shows a serrated attachment at the flap portion 11, which can be effective in reducing aerodynamic noise during operation of the wind turbine.

Figure 4:
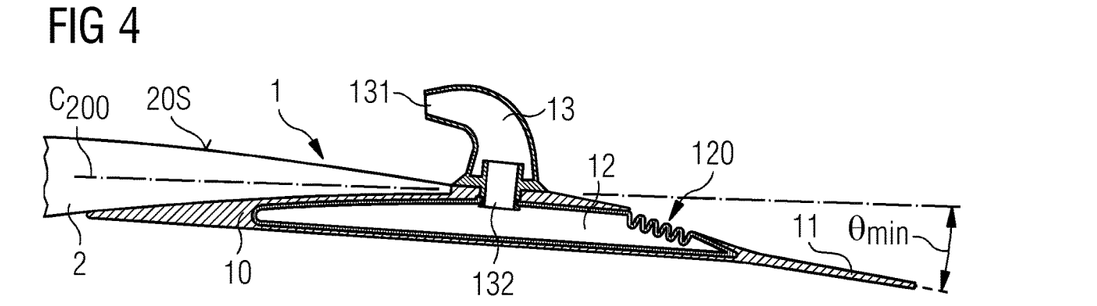
FIG. 4 shows a cross-section through a further embodiment of the inventive trailing edge assembly.
Figure 5:
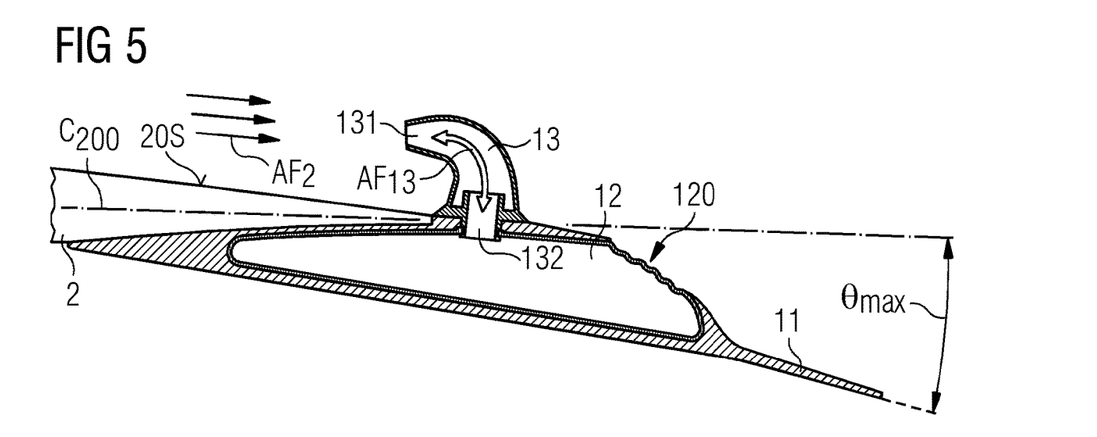
FIG. 5 shows the trailing edge assembly of FIG. 4 in an inflated state.

FIG. 4 shows a cross-section through a further embodiment of the inventive trailing edge assembly 1. Here, the inflatable body 12 comprises a ribbed or corrugated portion 120 arranged to lie in a gap between the mounting portion 10 and the flap portion 11. At a high angle of attack in the region of 10° to 12°, the boundary layer is thick and the stagnation pressure is correspondingly low. Therefore, there is not enough pressure to inflate the chamber 12 and the flap 11 is in its initial or default position, with minimum flap angle $\theta_{min}$, which is measured with reference to the local airfoil chord $C_{200}$. When the angle of attack decreases, the boundary layer over the suction side 20S is thin. The correspondingly high stagnation pressure will inflate the hose 12 and deflect the flap 11 as shown in FIG. 5. The diagram indicates airflow $AF_2$ over the rotor blade 2. Because the tube 13 faces into the airflow $AF_2$, air $AF_{13}$ enters the inflatable hose 12. At a low angle of attack, for example 4°-8°, the stagnation pressure in the inflatable hose 12 is sufficient to overcome the inherent resilience or stiffness of the passive flap system 1 and inflates the hose 12. The material properties of the passive flap system 1 are chosen to increase the flap angle from the minimum flap angle $\theta_{min}$ up to a maximum flap angle $\theta_{max}$. At higher angles of attack, for example 10°, the stagnation pressure in the inflatable hose 12 drops, and the inherent resilience of the passive flap system 1 causes air $AF_{13}$ to leave the inflatable hose 12 and the flap portion 11 moves back inwards, reducing the flap angle. Ultimately, the flap angle will return to its minimum $\theta_{min}$.

Figure 6:
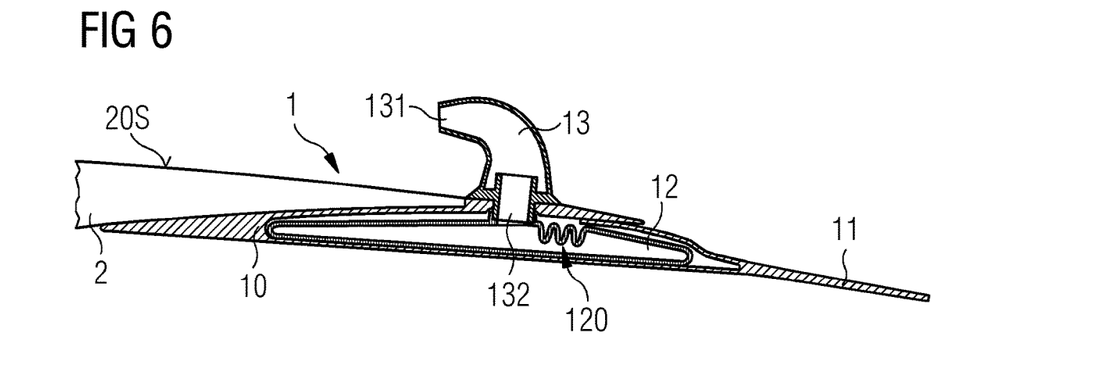
FIG. 6 shows a cross-section through a further embodiment of the inventive trailing edge assembly.

FIG. 6 shows a cross-section through a further embodiment of the inventive trailing edge assembly 1. This embodiment is similar to that of FIG. 5, using a ribbed portion 120 to allow the hose 12 to inflate, but the hose 12 in this case in completely covered by the mounting portion 10 and flap portion 11. This realisation may be exemplary if the inflatable hose 12 should not be exposed to the environment.

Figure 7:
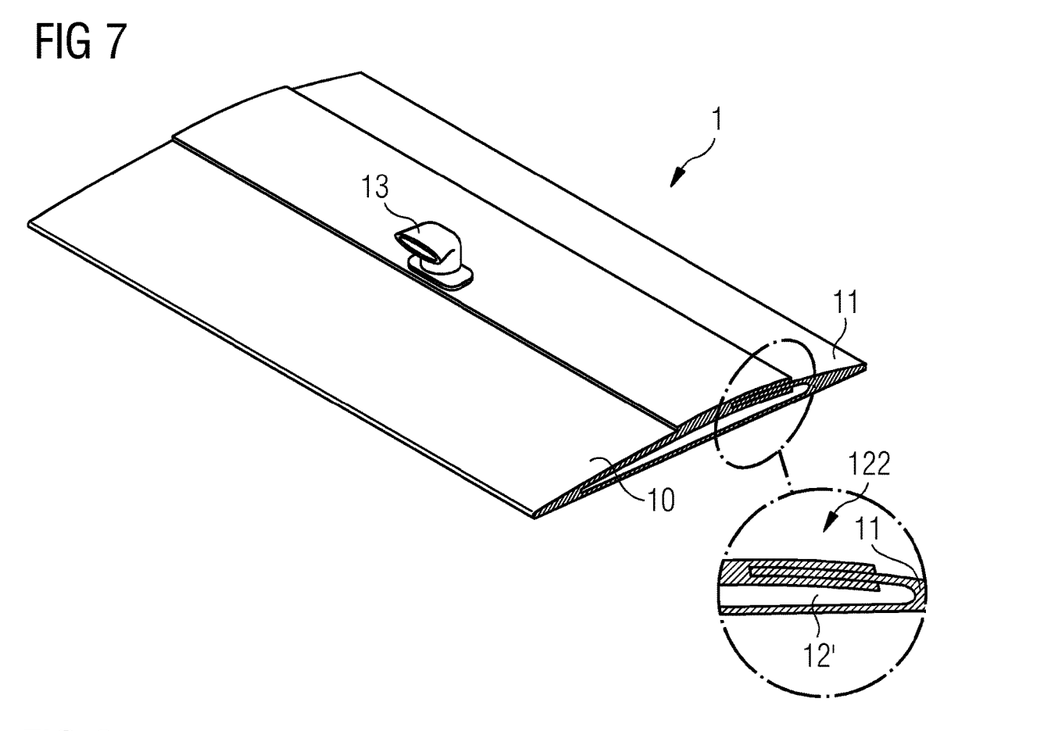
FIG. 7 shows a perspective view of a further embodiment of the inventive trailing edge assembly.
Figure 8:
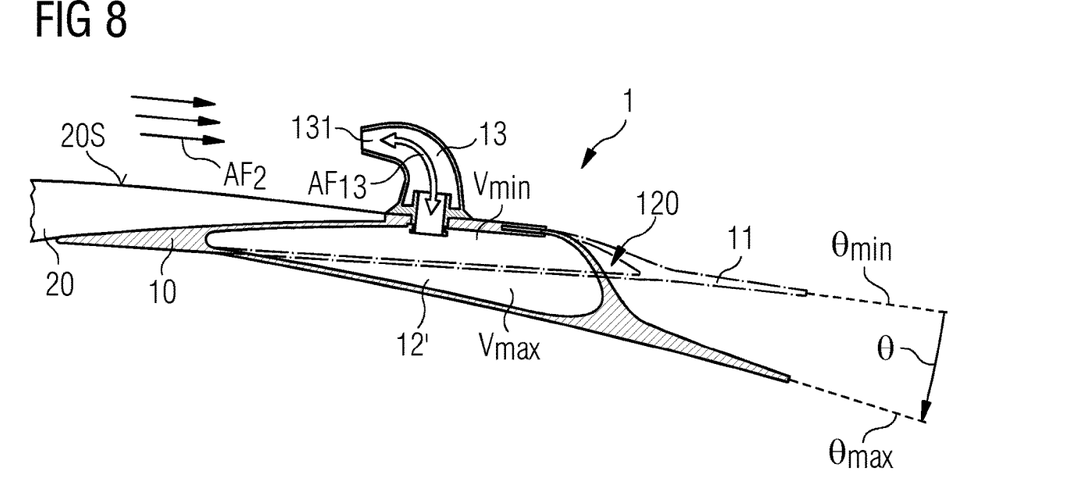
FIG. 8 shows a cross-section through the trailing edge assembly of FIG. 7.

FIG. 7 shows a perspective view of a further embodiment of the inventive trailing edge assembly 1. Here, the volume adjustable chamber 12' is realised by a cavity defined by the mounting portion 10 and flap portion 11, so that this embodiment does not make use of an inflatable body. To allow the stagnation pressure to expand the volume adjustable chamber 12', a labyrinth seal 122 is formed between the mounting portion 10 and flap portion 11. Here, an outer band of the flap portion 11 is contained between two complementary outer bands of the mounting portion 10, and can slide outwards in response to an increase in stagnation pressure, and can slide inwards when the stagnation pressure decreases. This is indicated in FIG. 8, which shows a cross-section through the trailing edge assembly of FIG. 7, and indicates the two extremes of the volume adjustable chamber 12'. In the "default" or resting state, the flap angle is at a minimum flap angle $\theta_{min}$ and the volume adjustable chamber 12' is at its minimum volume $V_{min}$. When the angle of attack is decreased, the stagnation pressure in the volume adjustable chamber 12' increases, and overcomes the inherent resilience of the passive flap system 1 to expand the volume adjustable chamber 12' up to a maximum volume $V_{max}$, and the flap angle can increase to a maximum flap angle $\theta_{max}$.

Figure 9:
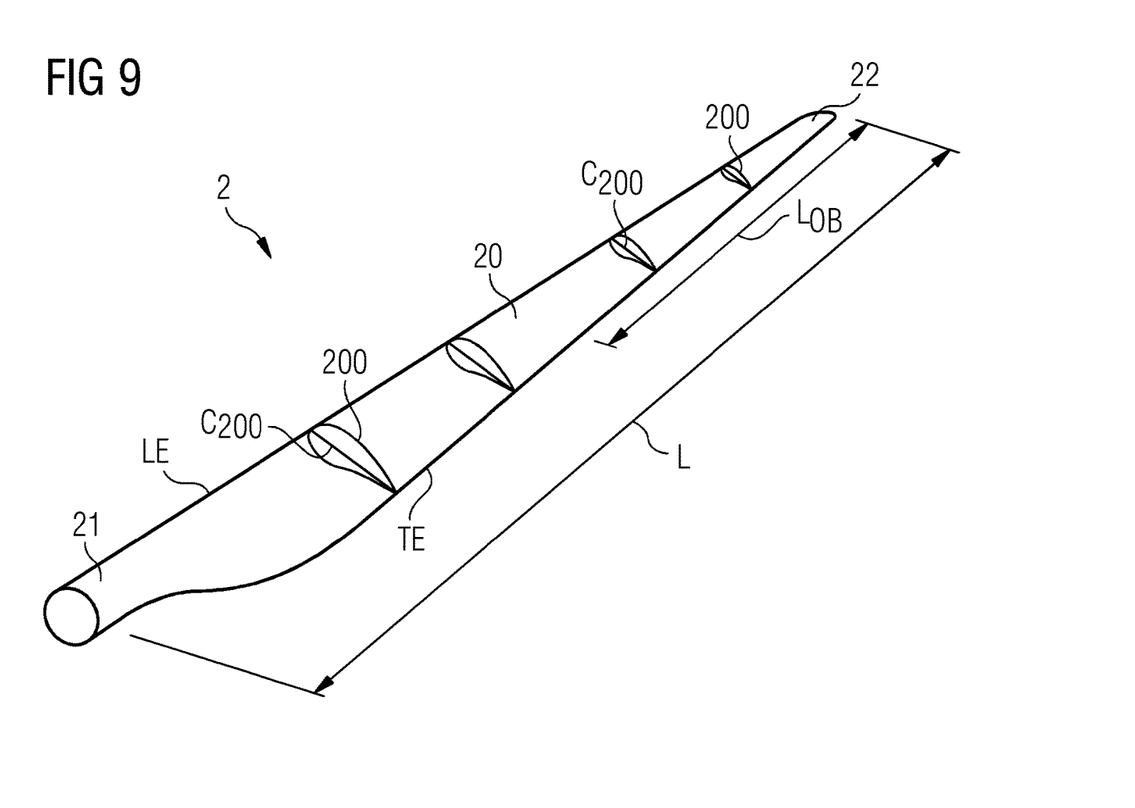
FIG. 9 shows a perspective view of a wind turbine rotor blade.

FIG. 9 shows a perspective view of a wind turbine rotor blade 2, which has an airfoil portion 20 over most of its length L. A circular root end 21 can be mounted to a pitch interface of the wind turbine hub. The airfoil portion 20 tapers gradually to a thin tip end 22, as indicated by the gradually diminishing airfoil shapes 200 indicated at intervals along the blade 2. The diagram also indicates a chord $C_{200}$ of an airfoil shape 200, extending from the leading edge LE of the blade 2 to the trailing edge TE. An embodiment of the inventive trailing edge assembly is arranged in an outboard region, indicated by the length $L_{OB}$ along the outer third of the rotor blade 2.

Figure 10:
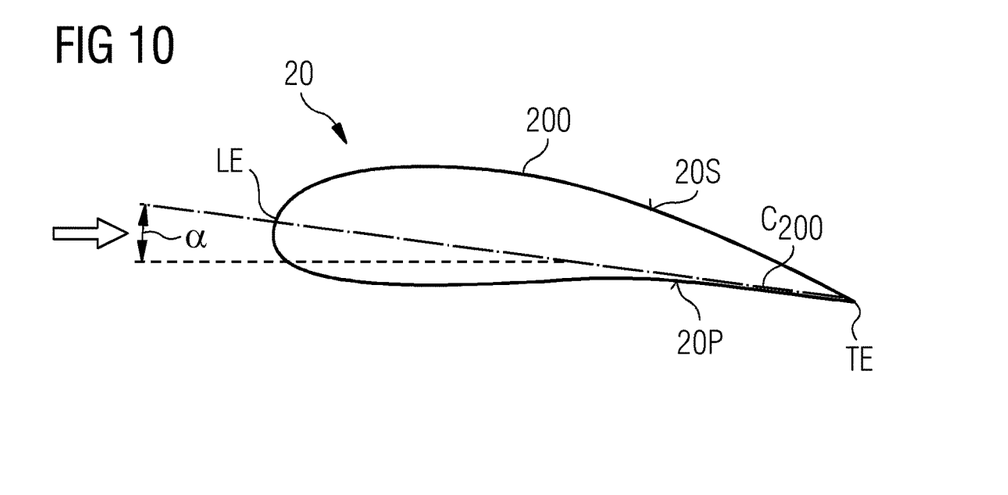
FIG. 10 shows a cross-section through the airfoil of the rotor blade of FIG. 9.

FIG. 10 shows a cross-section through the airfoil 20 of the rotor blade 2, and indicates an angle of attack α subtended between the chord $C_{200}$ and the wind direction (indicated by the arrow pointing towards the right). However, excessive blade loading at a relatively large angle of attack may arise due to flow separation. In the known art, a rotor blade without any flap angle adjustment means must be pitched to reduce the angle of attack in order to avoid excessive blade loading. However, this pre-emptive correction comes at the cost of reduced power output. Alternatively, an active flap adjustment means can be installed in a rotor blade, and an arrangement of sensors, actuators, motors etc. can react to adjust the flap angle as required. However, the associated manufacturing and maintenance costs can be significant. The inventive trailing edge assembly, when mounted to the trailing edge of an airfoil of the rotor blade 2, provides a cost-effective way of overcoming these problems.

Figure 11:
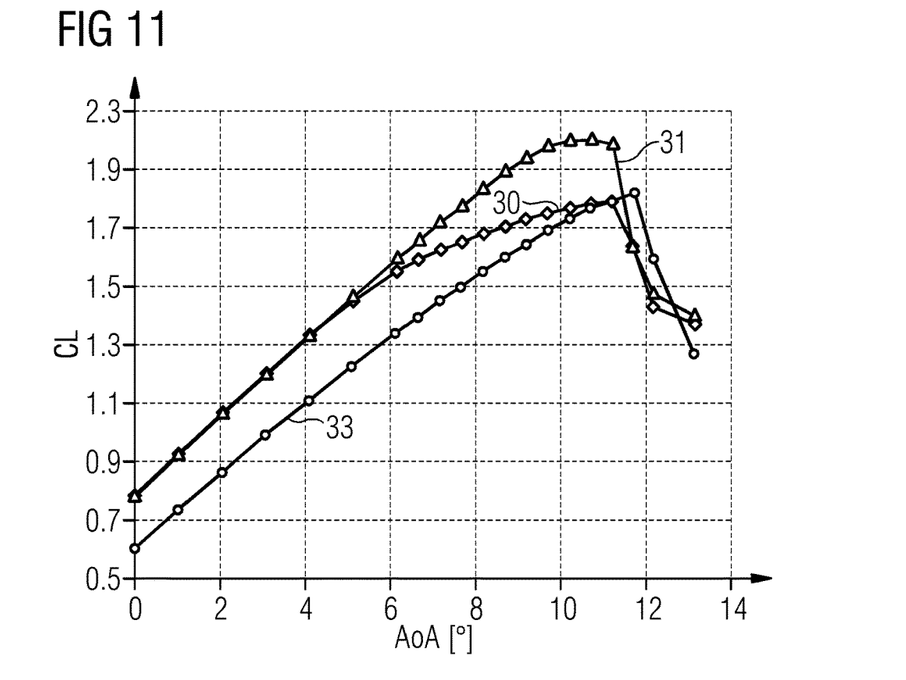
FIG. 11 shows a graph of lift coefficient against angle of attack for an embodiment of the inventive rotor blade.

FIG. 11 shows lift curves, i.e. graphs of lift coefficient CL (Y-axis, dimensionless) against angle of attack [°], for a static flap extension (lift curve 31), and for an embodiment of the inventive rotor blade (lift curve 30). A known lift curve 33 is also shown. This corresponds to a comparable rotor blade section (i.e. the same or similar dimensions) but without any flap adjustment means. The diagram indicates that the inventive rotor blade has a significantly higher lift coefficient for the same angle of attack. For one embodiment of the inventive rotor blade, as indicated by lift curve 30, the trailing edge assembly has been tailored to achieve a favourably flatter lift curve for angles of attack between 6° and 12°.

Figure 12:
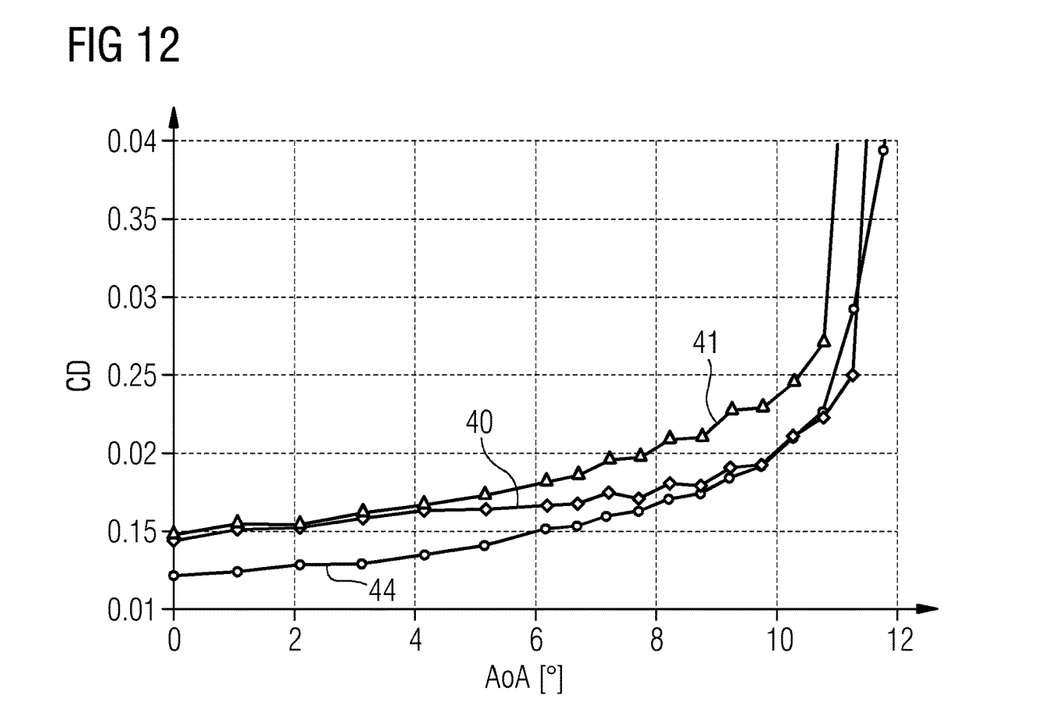
FIG. 12 shows a graph of drag coefficient against angle of attack for an embodiment of the inventive rotor blade.

FIG. 12 shows drag curves, i.e. graphs of drag coefficient (Y-axis, dimensionless) against angle of attack [°], for an embodiment of the inventive rotor blade (drag curve 40), and for a static flap extension (drag curve 41). A known drag curve 44 is shown which corresponds, in this case also, to a comparable rotor blade section (i.e. the same or similar dimensions) but without any flap adjustment means. The diagram indicates that the inventive rotor blade has a significantly lower drag coefficient for the same angle of attack when compared to an arrangement with a static flap 41, at angles of attack between for example 6° and 12°. For one embodiment of the inventive rotor blade, as indicated by drag curve 40, the trailing edge assembly has been tailored to achieve a favourably flatter drag curve for angles of attack between 6° and 10°.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A trailing edge assembly of a wind turbine rotor blade, which trailing edge assembly comprises:
    a mounting portion shaped for mounting to an airfoil region of the rotor blade;
    a flap portion flexibly connected to the mounting portion to allow alteration of a flap angle subtended between the mounting portion and the flap portion;
    a volume adjustable chamber arranged between the mounting portion and the flap portion and configured to alter its volume between a minimum volume associated with a minimum flap angle and a maximum volume associated with a maximum flap angle;
    at least one tube comprising an outer orifice arranged above the airfoil region of the rotor blade and arranged to face into an airflow passing over the airfoil region of the rotor blade, and an inner orifice arranged to face into the interior of the volume adjustable chamber such that an airflow between the outer orifice and the inner orifice alters the volume of the volume adjustable chamber.

2. The trailing edge assembly according to claim 1, wherein the mounting portion is shaped for mounting to the pressure side of the rotor blade airfoil region.

3. The trailing edge assembly according to claim 1, wherein the volume adjustable chamber is an inflatable body.

4. The trailing edge assembly according to claim 3, wherein the inflatable body is made of an elastic material.

5. The trailing edge assembly according to claim 4, wherein the inflatable body comprises a flexible ribbed portion extending between the mounting portion and the flap portion.

6. The trailing edge assembly according to claim 1, comprising a labyrinth seal between the mounting portion and the flap portion.

7. The trailing edge assembly according to claim 1, wherein the outer orifice of the tube is arranged at a height of at least 5 mm above an outer surface of the trailing edge assembly.

8. The trailing edge assembly according to claim 1, wherein the outer orifice of the tube comprises an elliptical cross-section.

9. The trailing edge assembly according to claim 1, configured to alter the flap angle by at least 2°.

10. A wind turbine rotor blade comprising at least one trailing edge assembly according to claim 1 mounted in the airfoil region of the rotor blade.

11. The wind turbine rotor blade according to claim 10, wherein at least one trailing edge assembly is arranged in an outboard region of the rotor blade between 60% and 100% of the rotor blade length.

12. A wind turbine rotor blade according to claim 10, wherein the flap portion of a trailing edge assembly extends outward from the rotor blade airfoil by 2%-20% of the local chord length of the airfoil.

13. The wind turbine rotor blade according to claim 12, wherein the flap portion of a trailing edge assembly in the outboard third of the rotor blade extends outward from the rotor blade airfoil by 4%-8% of the local chord length of the airfoil.

14. A trailing edge assembly of a rotor blade, the trailing edge assembly comprising:
    a mounting portion for mounting to an airfoil region of the rotor blade;
    a flap portion flexibly connected to the mounting portion to allow alteration of a flap angle between the mounting portion and the flap portion;
    a labyrinth seal between the mounting portion and the flap portion;
    a volume adjustable chamber arranged between the mounting portion and the flap portion and configured to alter volume between a minimum volume associated with a minimum flap angle and a maximum volume associated with a maximum flap angle;
    a tube comprising an outer orifice arranged to face into an airflow passing over the airfoil region of the rotor blade, and an inner orifice arranged to face into the interior of the volume adjustable chamber such that an airflow between the outer orifice and the inner orifice alters the volume of the volume adjustable chamber.

* * * * *